US011221451B2

(12) United States Patent
Chu et al.

(10) Patent No.: US 11,221,451 B2
(45) Date of Patent: Jan. 11, 2022

(54) OPTICAL FIBER CONNECTOR

(71) Applicant: ACON OPTICS COMMUNICATIONS INC., New Taipei (TW)

(72) Inventors: Guanghu Chu, New Taipei (TW); Jun Wu, New Taipei (TW); Yang Yang Cui, New Taipei (TW)

(73) Assignee: ACON OPTICS COMMUNICATIONS INC., New Taipei (TW)

( * ) Notice: Subject to any disclaimer, the term of this patent is extended or adjusted under 35 U.S.C. 154(b) by 0 days.

(21) Appl. No.: 16/952,041

(22) Filed: Nov. 18, 2020

(65) Prior Publication Data
US 2021/0181435 A1 Jun. 17, 2021

(30) Foreign Application Priority Data

Dec. 13, 2019 (CN) .......................... 201911281466.2

(51) Int. Cl.
G02B 6/36 (2006.01)
G02B 6/38 (2006.01)

(52) U.S. Cl.
CPC ......... *G02B 6/3897* (2013.01); *G02B 6/3869* (2013.01); *G02B 6/3874* (2013.01); *G02B 6/3893* (2013.01)

(58) Field of Classification Search
CPC .. G02B 6/3897; G02B 6/3869; G02B 6/3874; G02B 6/3893; G02B 6/3821; G02B 6/3871; G02B 6/3825; G02B 6/36
See application file for complete search history.

(56) References Cited

U.S. PATENT DOCUMENTS

| 8,403,570 | B2 * | 3/2013 | Fisher ................... G02B 6/3878 385/78 |
| 8,845,209 | B2 * | 9/2014 | Hikosaka ........... G02B 6/38875 385/81 |
| 9,207,410 | B2 * | 12/2015 | Lee ....................... G02B 6/3821 |
| 9,851,513 | B2 * | 12/2017 | Buddington ......... G02B 6/3888 |
| 2005/0084215 | A1 | 4/2005 | Grzegorzewska et al. |
| 2011/0206325 | A1 | 8/2011 | Hioki et al. |
| 2014/0068913 | A1 | 3/2014 | Zimmel et al. |

FOREIGN PATENT DOCUMENTS

EP 1331499 7/2003
JP 2018132694 8/2018

OTHER PUBLICATIONS

"Search Report of Europe Counterpart Application", dated May 7, 2021, p. 1-p. 5.

* cited by examiner

*Primary Examiner* — Jennifer Doan
(74) *Attorney, Agent, or Firm* — JCIPRNET

(57) ABSTRACT

An optical fiber connector including a housing, a core tube, and a blocking member is provided. The housing has a window. The core tube is rotatably disposed in the housing. The core tube has a gear structure, and a portion of the gear structure is exposed out of the housing through the window. The blocking member has a gear rack structure. The blocking member is detachably assembled to the window to cover the core tube, and the gear rack structure is locked with the gear structure to prevent the core tube from rotation.

10 Claims, 4 Drawing Sheets

OPTICAL FIBER CONNECTOR

CROSS-REFERENCE TO RELATED APPLICATION

This application claims the priority benefit of China application no. 201911281466.2, filed on Dec. 13, 2019. The entirety of the above-mentioned patent application is hereby incorporated by reference herein and made a part of this specification.

TECHNICAL FIELD

The invention relates to a connector, and more particularly, to an optical fiber connector.

BACKGROUND

Because of the advantages of high frequency and low loss, optic fibers have been widely used as a signal transmission medium in recent years. Further, with the technological expansion of optical communication networks, the popularity of wide area networks such as the Internet and intranets has been increased, and communication traffic has also been improved.

In general, a common optical fiber connector includes a female adapter for matching with a male optical fiber connector. The female adapter is disposed in an electronic device. When the male optical fiber connector is inserted into the female adapter, a connection relationship can be formed. By doing so, the purpose of engaging, fixing and data transmission may be achieved at the same time.

However, a concentricity between a connector housing and an optic fiber therein varies with manufacturing or assembly tolerances. Consequently, when the male optical fiber connectors at both ends are inserted to the female adapters at the same time, if the optic fibers in the male optical fiber connectors at both ends cannot be perfectly aligned, an optic fiber signal loss will occur.

Accordingly, how to improve a connecting accuracy is a problem that related technical personnel need to think about and overcome.

SUMMARY

The invention provides an optical fiber connector, which provides an adjustment mechanism for a core tube to improve an optic fiber transmission efficiency.

An optical fiber connector of the invention includes a housing, a core tube, and a blocking member. The housing has a window. The core tube is rotatably disposed in the housing. The core tube has a gear structure, and a portion of the gear structure is exposed out of the housing through the window. The blocking member has a gear rack structure. The blocking member is detachably assembled to the window to cover the core tube, and the gear rack structure is locked with the gear structure to prevent the core tube from rotation.

In an embodiment of the invention, the core tube includes a tube body and the gear structure. The tube body is rotatably disposed in the housing with an axis, and the gear structure is sleeved outside the tube body and surrounds the axis.

In an embodiment of the invention, a material of the tube body is a ceramic, and the material of the gear structure is a metal.

In an embodiment of the invention, the blocking member includes a plate body, the gear rack structure is disposed on the plate body, and the plate body is inserted to the window so that the gear structure and the gear rack structure are meshed with each other.

In an embodiment of the invention, the blocking member further includes an engaging pillar extending from a side edge of the plate body, and The window has a main opening and an engaging slot extending from the main opening. The portion of the gear structure is exposed out of the housing from the main opening to be covered by the plate body. The engaging pillar is engaged with the engaging slot.

In an embodiment of the invention, the housing includes a front case and a rear case, the core tube is assembled between the front case and the rear case along an axis, and the optical fiber connector further includes a spring abutted between the core tube and the rear case.

In an embodiment of the invention, the core tube includes a tube body and the gear structure, and the spring is sleeved on a portion of the tube body and abutted between the gear structure and the rear case.

In an embodiment of the invention, the optical fiber connector further includes an extended core tube disposed on the rear case and sleeved on the tube body, and the spring is sleeved on the portion of the tube body and the extended core tube.

In an embodiment of the invention, the front case further includes a blocking portion, and the gear structure is abutted between the spring and the blocking portion.

In an embodiment of the invention, the optical fiber connector is an LC (Lucent Connector) type optical fiber connector.

Based on the above, since the optical fiber connector is provided with the gear structure in its core tube so that the core tube and the gear structure are in a synchronous rotation state and the portion of the gear structure is exposed from the window of the housing, when connecting the optical fiber connector with another optical fiber connector, the user may adjust a connecting degree of the two optical fiber connectors by turning the exposed gear structure. Once the adjustment is completed, with the blocking member assembled to the window of the housing, the gear rack structure of the blocking member may be locked with the gear structure to smoothly prevent the core tube from rotation. In this way, when connecting the two optical fiber connectors, the user may use the aforementioned adjustment mechanism to make the optical fiber connector have a better connecting accuracy, thereby reducing attenuation and loss during the optical signal transmission.

DETAILED DESCRIPTION

Figure 1:
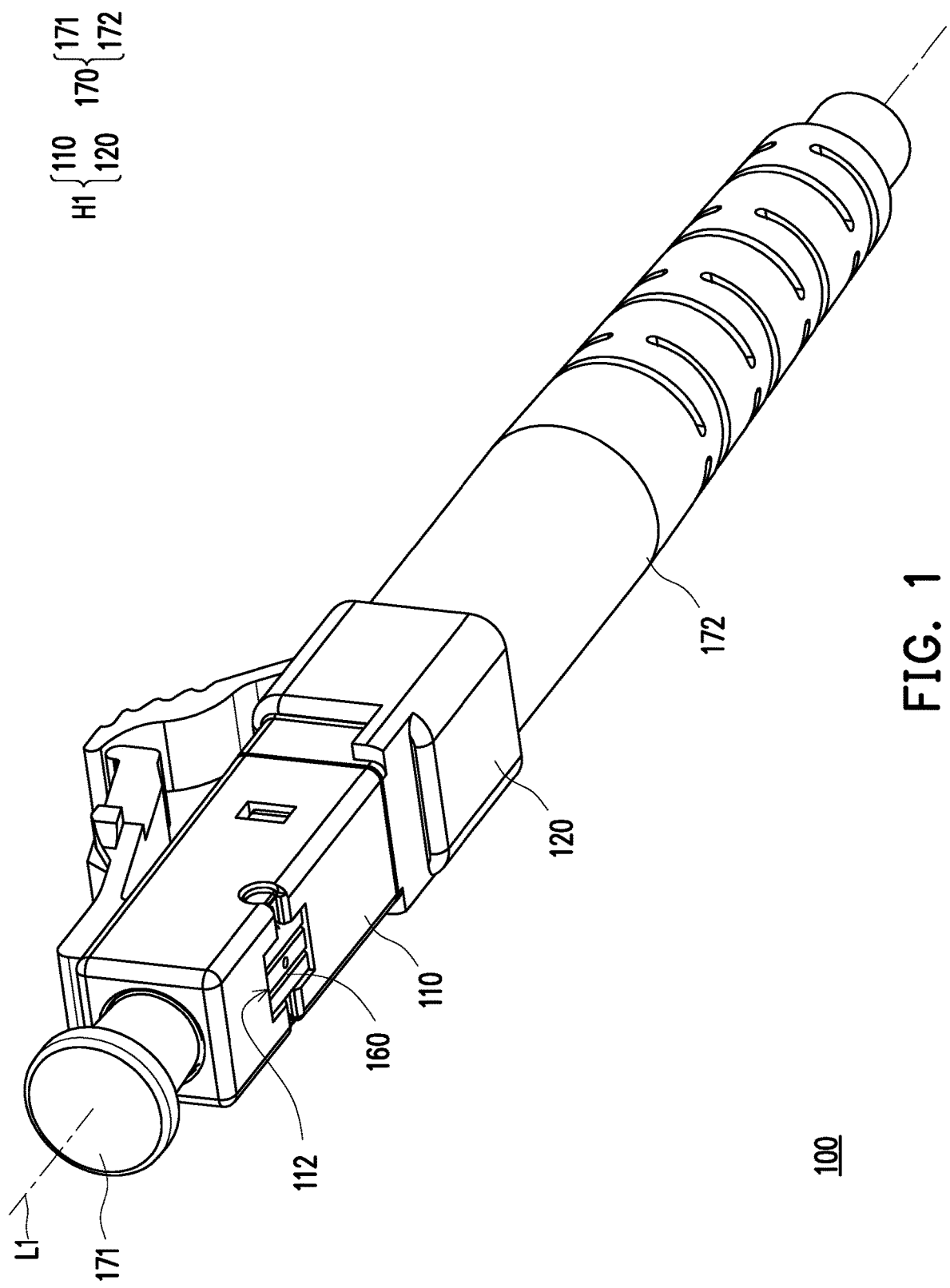
FIG. 1 is a schematic diagram of an optical fiber connector according to an embodiment of the invention.
Figure 2:
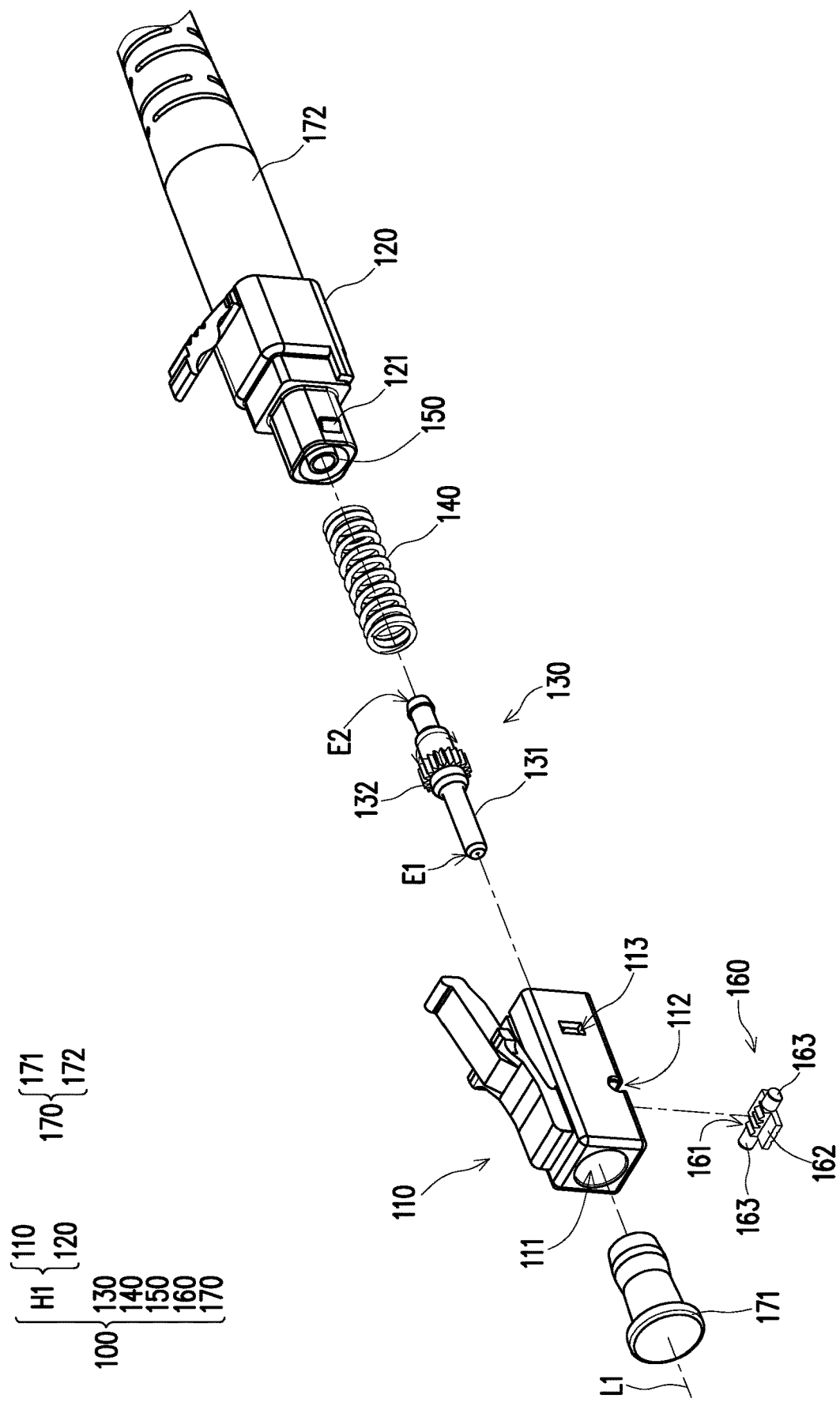
FIG. 2 is an explosion view of the optical fiber connector of FIG. 1.

FIG. 1 is a schematic diagram of an optical fiber connector according to an embodiment of the invention. FIG. 2 is an explosion view of the optical fiber connector of FIG. 1. Referring to FIG. 1 and FIG. 2 together, in this embodiment, an optical fiber connector 110 is, for example, an LC (Lucent Connector) type optical fiber connector, and includes a housing H1, a core tube 130 and a blocking member 160. The housing H1 of the present embodiment includes a front case 110 and a rear case 120 assembled to each other along an axis L1. Here, an engaging hole 113 of the front case 110 and a protruding portion 121 of the rear case 120 are engaged with each other to complete an assembly of the front case 110 and the rear case 120. The housing 110 has a window 112. The core tube 130 is rotatably disposed in the housing H1 with the axis L1, and is substantially located within an inner space composed of the front case 110 and the rear case 120. The core tube 130 has a gear structure 132, and a portion of the gear structure 132 is exposed out of the housing H1 through the window 112. The blocking member 160 has a gear rack structure 161. The blocking member 160 is detachably assembled to the window 112 to cover the core tube 130, and the gear rack structure 161 is locked with the gear structure 132 to prevent the core tube 130 from rotation with the axis L1.

More specifically, the core tube 130 includes a tube body 131 and the gear structure 132. Here, the tube body 131 has two end portions E1 and E2 opposite to each other along the axis L1, and is rotatably disposed inside the housing H1 with the axis L1. The gear structure 132 is sleeved outside the tube body 131 and surrounds the tube body 131 relative to the axis L1. In this embodiment, a material of the tube body 131 is a ceramic, a material of the gear structure 132 is a metal, and the tube body 131 and the gear structure 132 can be substantially combined with each other by a riveting process so that the gear structure 132 and the tube body 131 are in a synchronous rotation state with the axis L1.

Further, the core tube 130 is located within the inner space of the front case 110 and the rear case 120 along the axis L1. Here, the tube body 131 enters an internal space 111 of the front case 110 so that the end portion E1 protrudes out from the internal space 111 of the front case 110 to be sleeved and protected by a front sleeve 171 of a protection component 170. The optical fiber connector 100 further includes an extended core tube 150, disposed on the rear case 120 and sleeved on the end portion E2 of the tube body 131. Meanwhile, the rear case 120 is connected to the extended core tube 150 with an optic fiber tube (not shown) at the back to the front case 110, and provides a protection effect for an optic fiber core tube therein by a rear sleeve 172 of the protection component 170 disposed outside.

In addition, the optical fiber connector 100 further includes a spring 140, abutted between the core tube 130 and the rear case 120. The spring 140 is sleeved on a portion of the tube body 131 and the extended core tube 150. Further, the spring 140 is sleeved on the portion of the tube body 131 at the end portion E2 and abutted between the gear structure 132 and the rear case 120.

Figure 3:
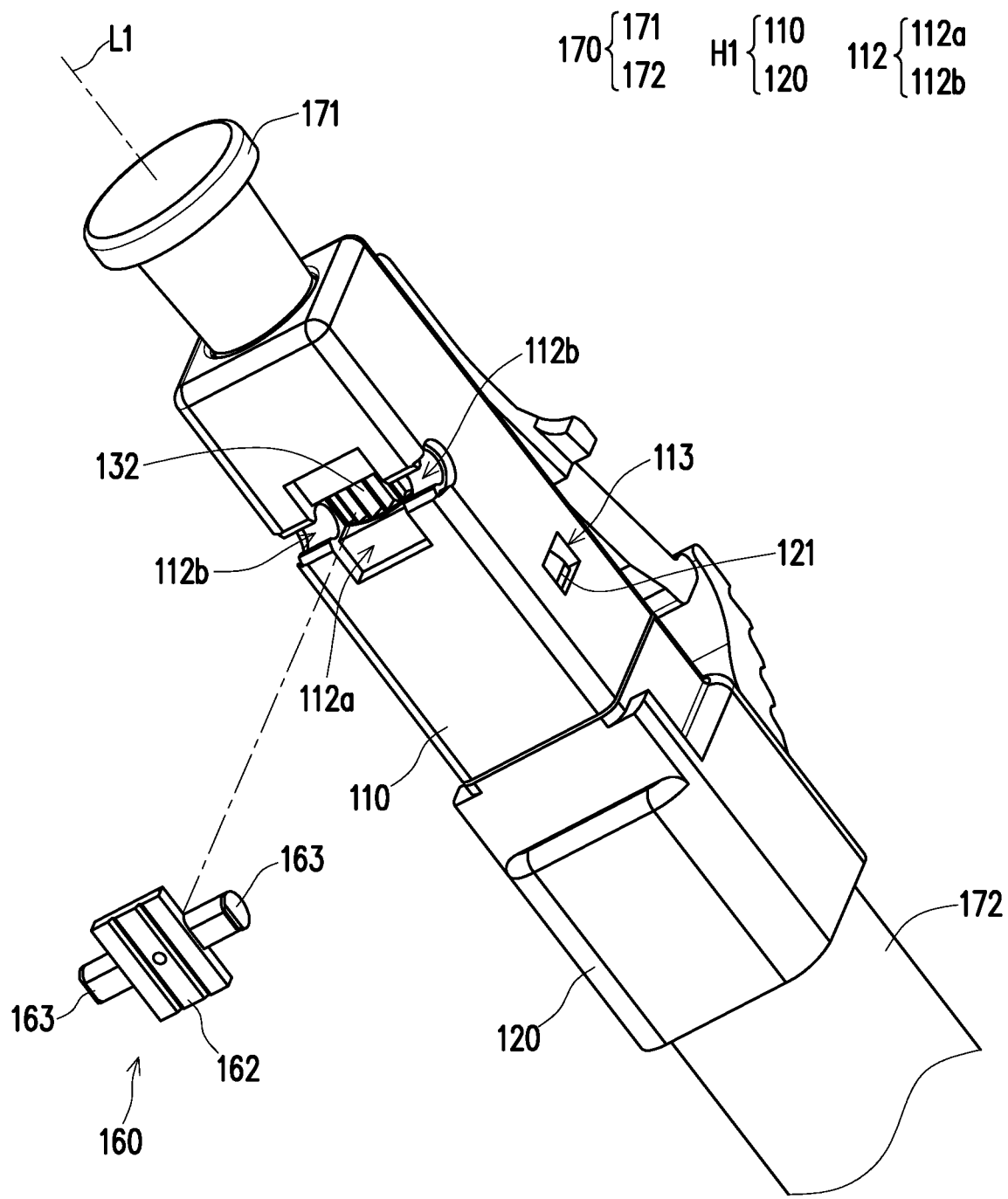
FIG. 3 is schematic diagram for assembling the optical fiber connector of FIG. 1.
Figure 4:
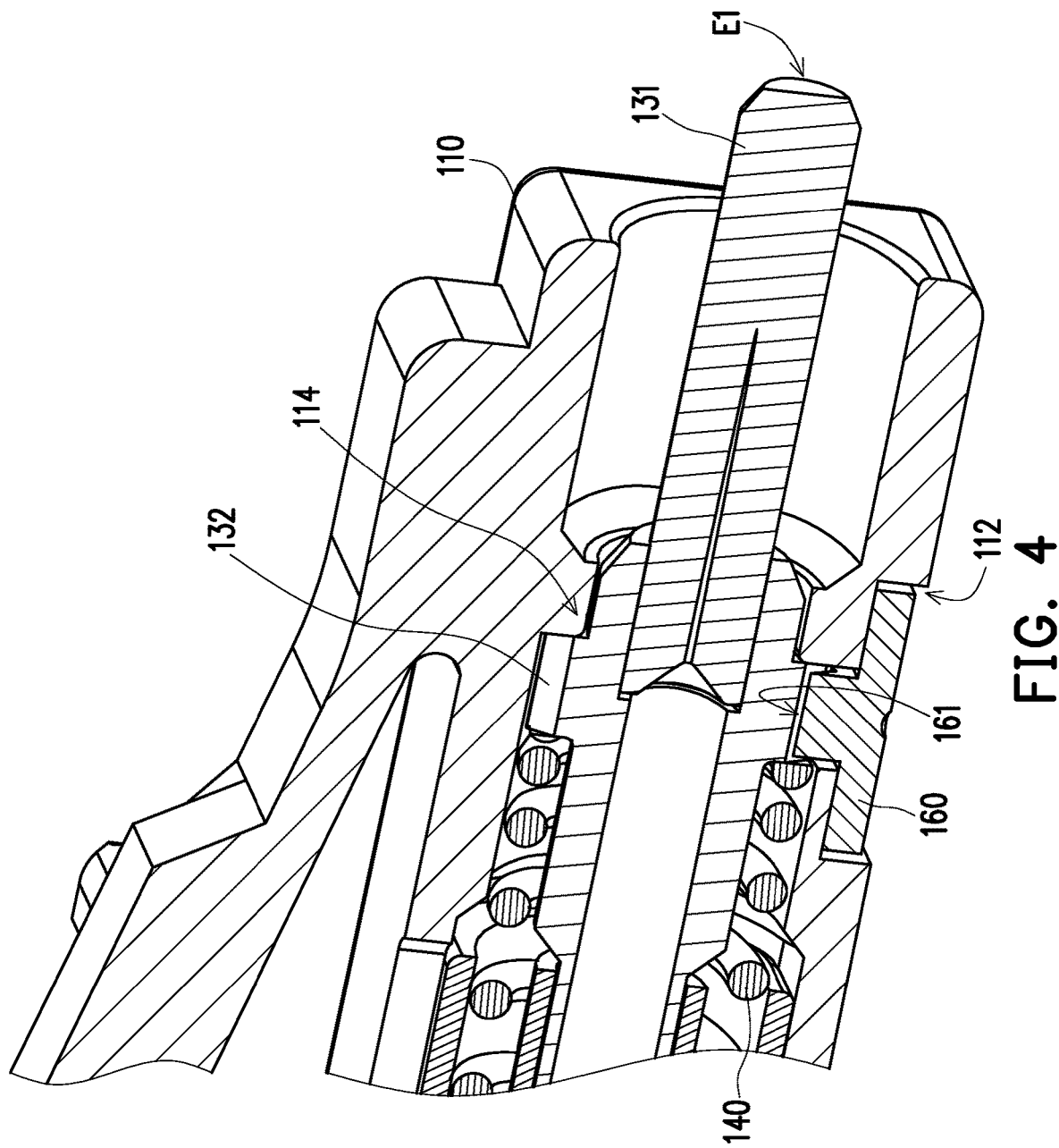
FIG. 4 is a partial cross-sectional view of the optical fiber connector of FIG. 1.

FIG. 3 is schematic diagram for assembling the optical fiber connector of FIG. 1. FIG. 4 is a partial cross-sectional view of the optical fiber connector of FIG. 1. Referring to FIG. 2 to FIG. 4 together, in this embodiment, the blocking member 160 includes a plate body 162. The gear rack structure 161 is disposed on the plate body 162. The plate body 162 is used to be inserted to the window 112 so that the gear rack structure 161 and the gear structure 132 are meshed with each other. In other words, because the core tube 130 is rotatably assembled in the housing H1 with the axis L1 and the portion of the gear structure 132 is exposed from the window 112 of the front case 110, when connecting the optical fiber connector 100 with another optical fiber connector (or an optic fiber adapter, which is not shown here), the end portion E1 of the core tube 130 may be connected with a core tube of said another optical fiber connector (or the optic fiber adapter). However, due to manufacturing tolerances, the core tubes of the optical fiber connectors connected with each other may face different concentricity. Therefore, by making the portion of the gear structure 132 exposed from the window 112, the user is able to rotate the core tube 130 by turning the exposed gear structure 132 with a tool during the connection, so as to achieve the effect of adjustment. Subsequently, after the optical fiber connectors to be connected achieve a desired optical signal transmission efficiency, by inserting the blocking member 160 to the window 112 of the front case 110 so that the gear rack structure 161 of the blocking member 160 and the gear structure 132 of the core tube 130 are meshed and locked with each other, the core tube 130 may be maintained at a desired position.

It should be noted that, the number of teeth of the gear structure 132 can be appropriately adjusted according to requirements. For instance, when the connecting accuracy of the optical fiber connectors is to be improved, a rotation accuracy of the core tube 130 may be increased by increasing the number of teeth of the gear structure 132. In this way, the user may provide the corresponding optical fiber connector 100 according to the accuracy requirement so that an applicable range of the optical fiber connector 100 may also be improved.

In this embodiment, the blocking member 160 further includes an engaging pillar 163 extending from a side edge of the plate body 162. The window 112 has a main opening 120a and an engaging slot 112b extending from the main opening 112a. The portion of the gear structure 132 is exposed out of the housing H1 from the main opening 112a to be covered by the plate body 162. Meanwhile, by having the engaging pillar 163 engaged with the engaging slot 112b so that the blocking member 160 may be fixed to the front case 110 of the housing H1, its locking relationship with the gear structure 132 may then be maintained.

In addition, as shown in FIG. 4, the front case 110 further includes a blocking portion 114, and the gear structure 132 is abutted between the spring 140 and the blocking portion 114. Here, the elastic force of the spring 140 constantly drives the gear structure 132 toward a connecting direction of the optical fiber connector 100 (toward the right in FIG. 4) so that the gear structure 132 is driven by the spring 140 to be abutted against the blocking portion 114. Accordingly, it can be ensured that when the user adjusts the core tube 130 by turning the gear structure 132 with the tool, with the gear structure 132 abutted against the blocking portion 114, the core tube 130 may be prevented from shifting along the axis L1 to thereby affect the result of angle adjustment performed on the core tube 130 by the user.

In summary, in the foregoing embodiments of the invention, since the optical fiber connector is provided with the gear structure in its core tube so that the core tube and the gear structure are in a synchronous rotation state and the portion of the gear structure is exposed from the window of the housing, when connecting the optical fiber connector with another optical fiber connector, the user may adjust a connecting degree of the two optical fiber connectors by turning the exposed gear structure. Once the adjustment is completed, with the blocking member assembled to the window of the housing, the gear rack structure of the blocking member may be locked with the gear structure to smoothly prevent the core tube from rotation. In this way, when connecting the two optical fiber connectors, the user may use the aforementioned adjustment mechanism to make the optical fiber connector have a better connecting accuracy, thereby reducing attenuation and loss during the optical signal transmission. Furthermore, the user may also provide the corresponding optical fiber connector according to the accuracy requirement, so an applicable range of the optical fiber connector may also be improved.

The invention claimed is:

1. An optical fiber connector, comprising:
a housing, having a window;
a core tube, rotatably disposed in the housing, the core tube having a gear structure, a portion of the gear structure being exposed out of the housing through the window; and
a blocking member, having a gear rack structure, the blocking member being detachably assembled to the window to cover the core tube, the gear rack structure being locked with the gear structure to prevent the core tube from rotation.

2. The optical fiber connector according to claim 1, wherein the core tube comprises a tube body and the gear structure, the tube body is rotatably disposed in the housing with an axis, and the gear structure is sleeved outside the tube body and surrounding the axis.

3. The optical fiber connector according to claim 2, wherein a material of the tube body is a ceramic, and the material of the gear structure is a metal.

4. The optical fiber connector according to claim 1, wherein the blocking member comprises a plate body, the gear rack structure is disposed on the plate body, and the plate body is inserted to the window so that the gear structure and the gear rack structure are meshed with each other.

5. The optical fiber connector according to claim 4, wherein the blocking member further comprises an engaging pillar extending from a side edge of the plate body, the window has a main opening and an engaging slot extending from the main opening, the portion of the gear structure is exposed out of the housing through the main opening to be covered by the plate body, and the engaging pillar is engaged with the engaging slot.

6. The optical fiber connector according to claim 1, wherein the housing comprises a front case and a rear case, the core tube is assembled between the front case and the rear case along an axis, and the optical fiber connector further comprises a spring abutted between the core tube and the rear case.

7. The optical fiber connector according to claim 6, wherein the core tube comprises a tube body and the gear structure, and the spring is sleeved on a portion of the tube body and abutted between the gear structure and the rear case.

8. The optical fiber connector according to claim 7, further comprising: an extended core tube, disposed on the rear case and sleeved on the tube body, the spring being sleeved on the portion of the tube body and the extended core tube.

9. The optical fiber connector according to claim 6, wherein the front case further comprises a blocking portion, the gear structure is abutted between the spring and the blocking portion.

10. The optical fiber connector according to claim 1, wherein the optical fiber connector is an LC type optical fiber connector.

* * * * *